US012724177B2

(12) United States Patent
Schreiber et al.

(10) Patent No.: US 12,724,177 B2

(45) Date of Patent: Sep. 1, 2026

(54) OPTICAL BEAM FORMER AND MASKLESS CHARACTER PROJECTOR

(71) Applicants: Fraunhofer-Gesellschaft zur Förderung der angewandten Forschung e.V., Munich (DE); Friedrich-Schiller-Universität Jena, Jena (DE)

(72) Inventors: Peter Schreiber, Jena (DE); Rohan Kundu, Jena (DE); Dirk Michaelis, Jena (DE)

(73) Assignees: Fraunhofer-Gesellschaft zur Förderung der angewandten Forschung e.V., Munich (DE); Friedrich-Schiller-Universität Jena, Jena (DE)

(*) Notice: Subject to any disclaimer, the term of this patent is extended or adjusted under 35 U.S.C. 154(b) by 0 days.

(21) Appl. No.: 19/087,514

(22) Filed: Mar. 23, 2025

(65) Prior Publication Data

US 2025/0216054 A1 Jul. 3, 2025

Related U.S. Application Data

(63) Continuation of application No. PCT/EP2023/076092, filed on Sep. 21, 2023.

(30) Foreign Application Priority Data

Sep. 23, 2022 (DE) ......................... 102022210090.5

(51) Int. Cl.

| | |
|---|---|
| ***G02B 3/00*** | (2006.01) |
| ***G02B 27/09*** | (2006.01) |
| *F21V 5/00* | (2018.01) |

(52) U.S. Cl.

CPC ......... *G02B 3/0056* (2013.01); *G02B 3/0062* (2013.01); *G02B 27/0961* (2013.01); *F21V 5/008* (2013.01)

(58) Field of Classification Search

CPC ... F21V 5/008; G02B 3/0062; G02B 27/0961; G02B 3/0056

(Continued)

(56) References Cited

U.S. PATENT DOCUMENTS 10,254,449 B2 4/2019 Eckstein et al.
2018/0199017 A1* 7/2018 Michaelis .............. G02B 27/18

(Continued)

FOREIGN PATENT DOCUMENTS

CN 103050502 A 4/2013
CN 111190320 A 5/2020

(Continued)

OTHER PUBLICATIONS

International Search Report in International application No. PCT/EP2023/076092, mailed on Jan. 3, 2024.

(Continued)

*Primary Examiner* — Magda Cruz

(74) *Attorney, Agent, or Firm* — PV IP PC; Wei Te Chung

(57) ABSTRACT

An optical beam former for generating an emerging light beam from an incident light beam includes a condenser lens array for receiving the incident light beam, wherein the condenser lens array includes a plurality of condenser lenses. The optical beam former includes a projection lens array arranged parallel to the condenser lens array for emitting the incident light beam, wherein the projection lens array comprises a plurality of projection lenses. The condenser lens array comprises at least one cluster of condenser lenses, wherein each condenser lens of the cluster comprises (Continued)

an aperture adapted to a subarea of an overall pattern projected by the optical beam former to provide, for the projection lens array, part of the incident light beam associated with the subarea of the overall pattern. A combination of the apertures of the condenser lenses is adapted to the overall pattern.

16 Claims, 13 Drawing Sheets

(58) Field of Classification Search
USPC ........................................................ 353/36
See application file for complete search history.

(56) References Cited

U.S. PATENT DOCUMENTS

| | | | | |
|---|---|---|---|---|
| 2018/0320852 | A1 | 11/2018 | Mandl | |
| 2018/0345714 | A1 | 12/2018 | Jolic et al. | |
| 2020/0218077 | A1* | 7/2020 | Li | G02B 3/0037 |

FOREIGN PATENT DOCUMENTS

| | | | | |
|---|---|---|---|---|
| DE | 3235057 | A1 | 6/1983 | |
| DE | 102016204344 | A1 | 9/2017 | |
| DE | 102017217345 | B4 | 12/2019 | |
| DE | 102020126716 | A1 * | 4/2022 | F21S 41/43 |
| JP | 2002350773 | A | 12/2002 | |
| JP | 2007094217 | A | 4/2007 | |
| JP | 2009223192 | A | 10/2009 | |
| JP | 2012530263 | A | 11/2012 | |
| JP | 2018531495 | A | 10/2018 | |
| JP | 2020535487 | A | 12/2020 | |
| WO | 2011027254 | A1 | 3/2011 | |

OTHER PUBLICATIONS

Written Opinion of the International Search Authority in International application No. PCT/EP2023/076092, mailed on Jan. 3, 2024.
The Second Written Opinion of the International Search Authority in International application No. PCT/EP2023/076092, mailed on Aug. 2, 2024.
International Preliminary Report on Patentability in International application No. PCT/EP2023/076092, dated Dec. 23, 2024.
Germany Office Action issued in corresponding Germany Patent Application No. 102022210090.5 dated May 12, 2023, pp. 9-14.
Geißler, Enrico "Meeting the challenges of developing LED-based projection displays." Photonics in Multimedia. vol. 6196. SPIE, 2006.
Sieler, Marcel et al. "Ultraslim fixed pattern projectors with inherent homogenization of illumination", Appl. Opt. 51 (2012) 64-71.
Fischer, Stephanie et al. "Array projector design for projection on arbitrarily curved surfaces." Optical Systems Design 2015: Optical Design and Engineering VI. vol. 9626. SPIE, 2015.
Dannberg, Peter et al. "Wafer-level hybrid integration of complex micro-optical modules." Micromachines 5.2 (2014): 325-340.
Buckley, Edward "Computer-Generated Phase-Only Holograms for Real-Time Image Display", Nov. 2011, DOI:10.5772/18709.
Schreiber, Peter et al. "Light Shaping with Micro-optical Irregular Fly's Eye Condensers", IODC 2021, vol. 12078, SPIE 2021, 1207813.
Japanese Office Action issued in corresponding Japanese Patent Application No. 2025-517639 dated May 1, 2026, pp. 1-6.
Korean Office Action issued in corresponding Korean Patent Application No. 10-2025-7013200 dated Jul. 6, 2026, pp. 6-11.

* cited by examiner

34
$36_1$
$18_1$
$42_1$
$38_1$
$36_2$
$42_2$
$38_2$
$18_2$
$42_3$
$36_3$
$38_3$
$18_3$

28
$32_1$
$32_2$
$32_3$
28

OPTICAL BEAM FORMER AND MASKLESS CHARACTER PROJECTOR

CROSS-REFERENCE TO RELATED APPLICATIONS

This application is a continuation of copending International Application No. PCT/EP2023/076092, filed Sep. 21, 2023, which is incorporated herein by reference in its entirety, and additionally claims priority from German Application No. 102022210090.5, filed Sep. 23, 2022, which is also incorporated herein by reference in its entirety.

The present invention relates to an optical beam former for generating an emerging light beam from an incident light beam, to a projector comprising such an optical beam former and to methods for providing an optical beam former and for configuring a condenser lens array. In particular, the present invention relates to a maskless character projector.

BACKGROUND OF THE INVENTION

Character projectors are used to transmit information, e.g. for route markings (so-called exit signs, visitor guidance or similar), Car2X communication in the automotive sector, for advertising purposes or in user interfaces, for example in household electronics. Gobo projectors frequently used for these applications work according to the principle of the classic slide projector, typically with LED lighting with a binary slide (gobo) or a gobo turret for projecting multiple images.

Basically, the system transmission is limited by the surface area of the openings of the gobo used. The needed illuminance of the projected image, together with the luminance of the light source, determines the minimum lateral expansion of the projector. These relationships are explained by the etendue of light source and projection optics [1]. The installation length of the projector, in turn, is largely determined by the focal length of the projection optics (from a few 10 mm to over 100 mm). The increase in system transmission and the miniaturization of classic projectors are strictly limited by these principles.

An alternative approach using micro-optical projector arrays with Köhler illumination (array projector) enables a significant reduction of the installation length by using tandem microlens arrays (MLA) of short focal length with buried, binary micro-slide arrays [2]. Basically, this optical scheme corresponds to a honeycomb condenser comprising an aperture or slide array buried close to the input lenses. With this projector architecture, space-saving setups are possible on the one hand and, on the other hand, projection onto inclined and curved screen surfaces is also possible due to the large depth of field of the array projector channels [3]. However, the transmission of the array projector, like that of the classic slide projector, is primarily limited by the area filling factor of the binary micro-slide array. The production of the MLA together with the buried slide arrays proves to be difficult: This involves sequential replication of the slides and both MLAs with very precise centering in the micrometer range. The costly replication needs modified mask aligners [4].

Small-sized character projectors with high transmission can be realized with laser-illuminated computer-generated holograms (CGH). Although these CGHs can be replicated inexpensively, e.g. by hot stamping in plastic, the attractiveness of this approach is limited by interfering light (e.g. from parasitic diffraction orders of the CGH), speckle and only limited wavelengths of laser diodes, in particular no white light [5].

It would therefore be desirable to be able to provide projectors for displaying characters with a wide application range that can be manufactured precisely and cost-effectively.

SUMMARY

According to an embodiment, an optical beam former for generating an emerging light beam from an incident light beam may have: a condenser lens array for receiving the incident light beam, wherein the condenser lens array includes a plurality of condenser lenses; and a projection lens array arranged parallel to the condenser lens array for emitting the emerging light beam, wherein the projection lens array includes a plurality of projection lenses, wherein the condenser lens array includes at least one cluster of condenser lenses, wherein each condenser lens of the cluster includes an aperture adapted to a subarea of an overall pattern projected by the optical beam former to provide, for the projection lens array, part of the incident light beam associated with the subarea of the overall pattern; wherein a combination of the apertures of the condenser lenses is adapted to the overall pattern; wherein the overall pattern is a graphic to be illustrated; wherein each subarea images a subgraphic of the overall pattern; wherein the aperture of the condenser lens is a boundary of the condenser lens and is formed geometrically similar to outer boundaries of the respective subarea.

According to another embodiment, a projector may have: an inventive optical beam former; and a light source for providing the incident light beam.

According to another embodiment, a method for providing an optical beam former for generating an emerging light beam from an incident light beam may have the steps of: providing a condenser lens array for receiving the incident light beam, such that the condenser lens array includes a plurality of condenser lenses; and arranging a projection lens array set up to emit the emerging light beam parallel to the condenser lens array, such that the projection lens array includes a plurality of projection lenses, such that the condenser lens array includes at least one cluster of condenser lenses, wherein each condenser lens of the cluster includes an aperture adapted to a subarea of an overall pattern projected by the optical beam former to provide, for the projection lens array, part of the incident light beam associated with the subarea of the overall pattern; such that a combination of the apertures of the condenser lenses is adapted to the overall pattern; such that the overall pattern is a graphic to be illustrated; such that each subarea images a subgraphic of the overall pattern; such that the aperture of the condenser lens is a boundary of the condenser lens and is formed geometrically similar to outer boundaries of the respective subarea.

According to another embodiment, a method for configuring a condenser lens array with a plurality of condenser lenses for an optical beam former may have the steps of: splitting an overall area of an overall pattern to be projected, which is a graphic to be illustrated, into a plurality of subareas as a subgraphic of the graphic to be illustrated; adapting a respective aperture of a condenser lens of the condenser lens array to one of the plurality of subareas; to project each of the plurality of subareas with at least one adapted condenser lens; such that the aperture of the condenser lens is a boundary of the condenser lens and is formed geometrically similar to outer boundaries of the respective subarea; positioning the plurality of condenser lenses in the condenser lens array.

It is core idea of the present invention that by using irregularly delimited microlenses in microlens arrays, the aperture of which is adapted to the pattern to be displayed by the respective microlens, beam forming can also take place, but unlike with buried slides, this can be done without reduced transmission, which is why the output light power is comparably high and positioning of the corresponding microslides can be dispensed with.

This results, on the one hand, in a wide application range, since such microlenses can be irradiated with any wavelength, and, on the other hand, in the possibility of precise, simple and, in particular, cost-effective replication.

According to an embodiment, an optical beam former for generating an emerging light beam from an incident light beam includes a condenser lens array for receiving the incident light beam, wherein the condenser lens array comprises a plurality of condenser lenses; and a projection lens array arranged parallel to the condenser lens array for emitting the emerging light beam, wherein the projection lens array comprises a plurality of projection lenses. The condenser lens array comprises at least one cluster of condenser lenses, wherein each condenser lens of the cluster comprises an aperture adapted to a subarea of an overall pattern projected by the optical beam former to provide, for the projection lens array, part of the incident light beam associated with the subarea of the overall pattern; wherein a combination of the apertures of the condenser lenses is adapted to the overall pattern.

According to one embodiment, a method for providing an optical beam former for generating an emerging light beam from an incident light beam comprises the steps of: providing a condenser lens array for receiving the incident light beam, such that the condenser lens array comprises a plurality of condenser lenses; and arranging a projection lens array set up to emit the emerging light beam parallel to the condenser lens array, such that the projection lens array comprises a plurality of projection lenses, such that the condenser lens array comprises at least one cluster of condenser lenses, wherein each condenser lens of the cluster comprises an aperture adapted to a subarea of an overall pattern projected by the optical beam former to provide, for the projection lens array, part of the incident light beam associated with the subarea of the overall pattern; such that a combination of the apertures of the condenser lenses is adapted to the overall pattern.

According to an embodiment, a method for configuring a condenser lens array comprising a plurality of condenser lenses for an optical beam former comprises splitting an overall area of an overall pattern to be projected into a plurality of subareas; adapting a respective aperture of a condenser lens of the condenser lens array to one of the plurality of subareas; to project each of the plurality of subareas with at least one adapted condenser lens; and positioning the plurality of condenser lenses in the condenser lens array.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention are explained in more detail below with reference to the drawings, it should be noted that identical, functionally equal or equal elements, objects and/or structures are provided with the same reference numbers in the different figures, so that the description of these elements shown in different embodiments is interchangeable or interapplicable.

The embodiments described below are described in connection with a large number of details. However, embodiments can also be implemented without these detailed features. Further, for the sake of clarity, embodiments are described using block diagrams as a substitute for a detailed illustration. Further, details and/or features of individual embodiments can be combined with each other, as long as it is not explicitly described to the contrary.

Figure 1A:
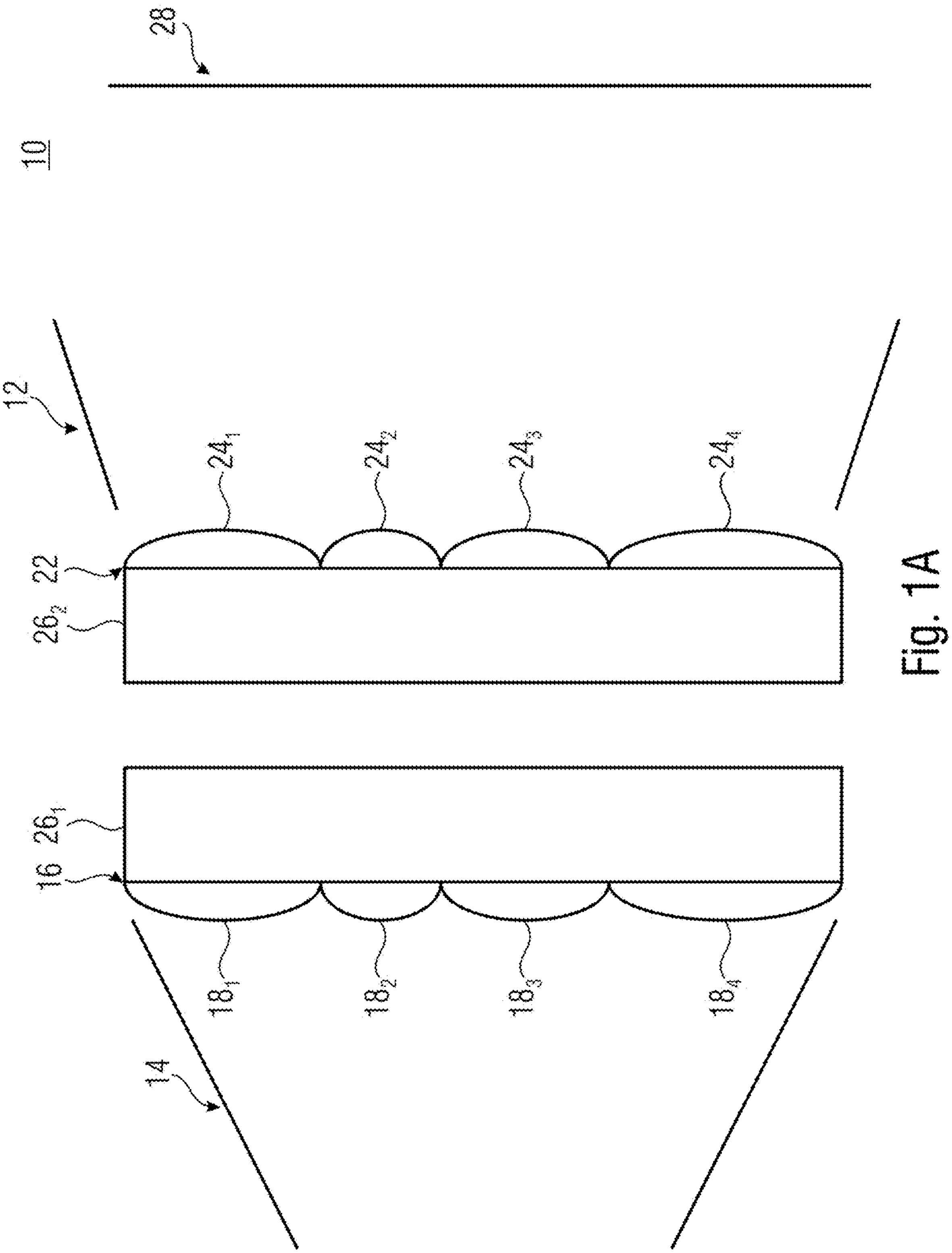
FIG. 1*a* is a schematic side sectional view of an optical beam former according to an embodiment.

FIG. 1*a* shows a schematic side sectional view of an optical beam former 10 according to an embodiment. The optical beam former 10 is configured to generate an emerging light beam 12 from an incident light beam 14. The optical beam former 10 includes a condenser lens array 16 for receiving the incident light beam 14. The condenser lens array 16 includes a plurality of at least two, at least three, advantageously at least four, at least ten, particularly advantageously one hundred or several hundred or even more condenser lenses $\mathbf{18}_1$-$\mathbf{18}_4$. A projection lens array 22 is arranged parallel to the condenser lens array 16, which is set up to emit the emerging light beam 12. The projection lens array 22 includes a plurality of condenser lenses $\mathbf{24}_1$-$\mathbf{24}_4$.

Substrates $26_1$ and $26_2$ of the arrays 16 and 22 can be formed separately from one another, but can also be formed integrally.

According to an embodiment, one condenser lens $18_i$ each can form an array channel together with a respective projection lens $24_j$. In such an embodiment, a number of projection lenses 24 of the projection array 22 can be equal to a number of condenser lenses 18 of the condenser lens array 16. However, embodiments are not limited to this, so that a number of projection lenses 24 can also differ from a number of condenser lenses 18.

The condenser lens array 16 comprises at least one cluster of condenser lenses 18, wherein each condenser lens comprises an aperture adapted to a subarea of an overall pattern 28 projected by the optical beam former 10 in order to provide, for the projection lens array 22, part of the incident light beam 14 that is associated to the subarea of the overall pattern. The combination of the apertures of the condenser lenses is adapted to the overall pattern 28.

Figures 1B, 1C, 1D:
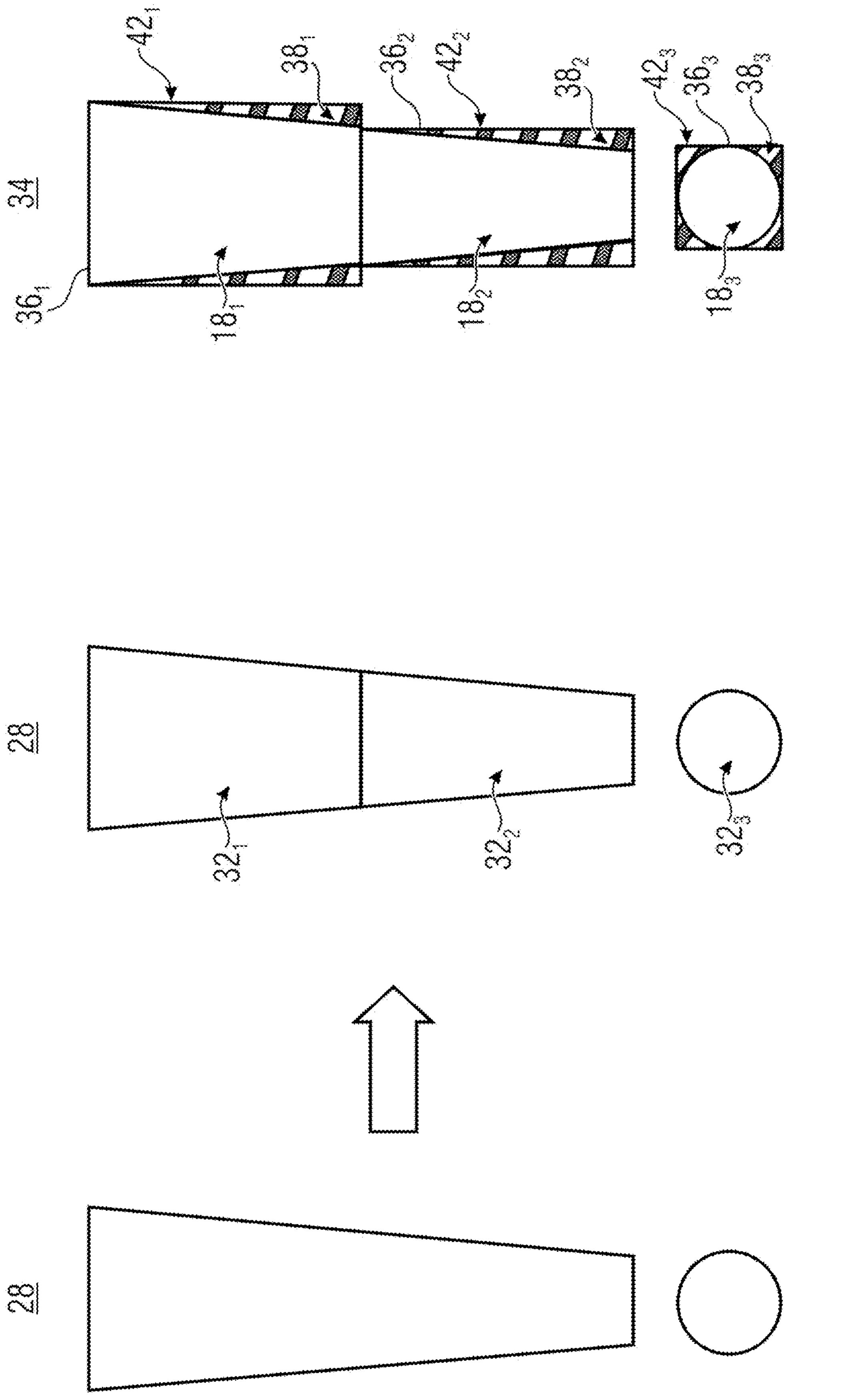
FIG. 1*b* is a schematic top view of an exemplary configuration of a pattern in connection with embodiments discussed herein.
FIG. 1*c* is a schematic top view of the pattern in FIG. 1*b*, which is divided into a number of exemplary three subareas to illustrate embodiments.
FIG. 1*d* is a schematic top view of a cluster of condenser lenses with apertures adapted to the respective subarea of FIG. 1*b*, according to an embodiment.

FIG. 1*b* shows a schematic top view of an exemplary configuration of the pattern 28, which has the form of an exclamation mark "!" by way of example and in no way limiting.

FIG. 1*c* shows a schematic plan view of the pattern 28 of FIG. 1*b*, which is divided into a number of exemplary three subareas $32_1$, $32_2$ and $32_3$. Rules of interpretation for dividing the pattern 28 into the subareas $32_1$-$32_3$ are discussed below. However, the shape or geometry of the subareas $32_1$-$32_3$ can form a basis for the apertures of the condenser lenses of the condenser lens array 16, wherein using three condenser lenses can already be sufficient for the projection of the pattern 28.

FIG. 1*d* shows a schematic top view of a cluster 34 of condenser lenses $18_1$, $18_2$ and $18_3$, wherein the cluster 34 can form at least part of the condenser lens array 16. For easy association with to the overall graphic of FIG. 1*c*, the cluster is shown inverted and upside down.

Figure 2:
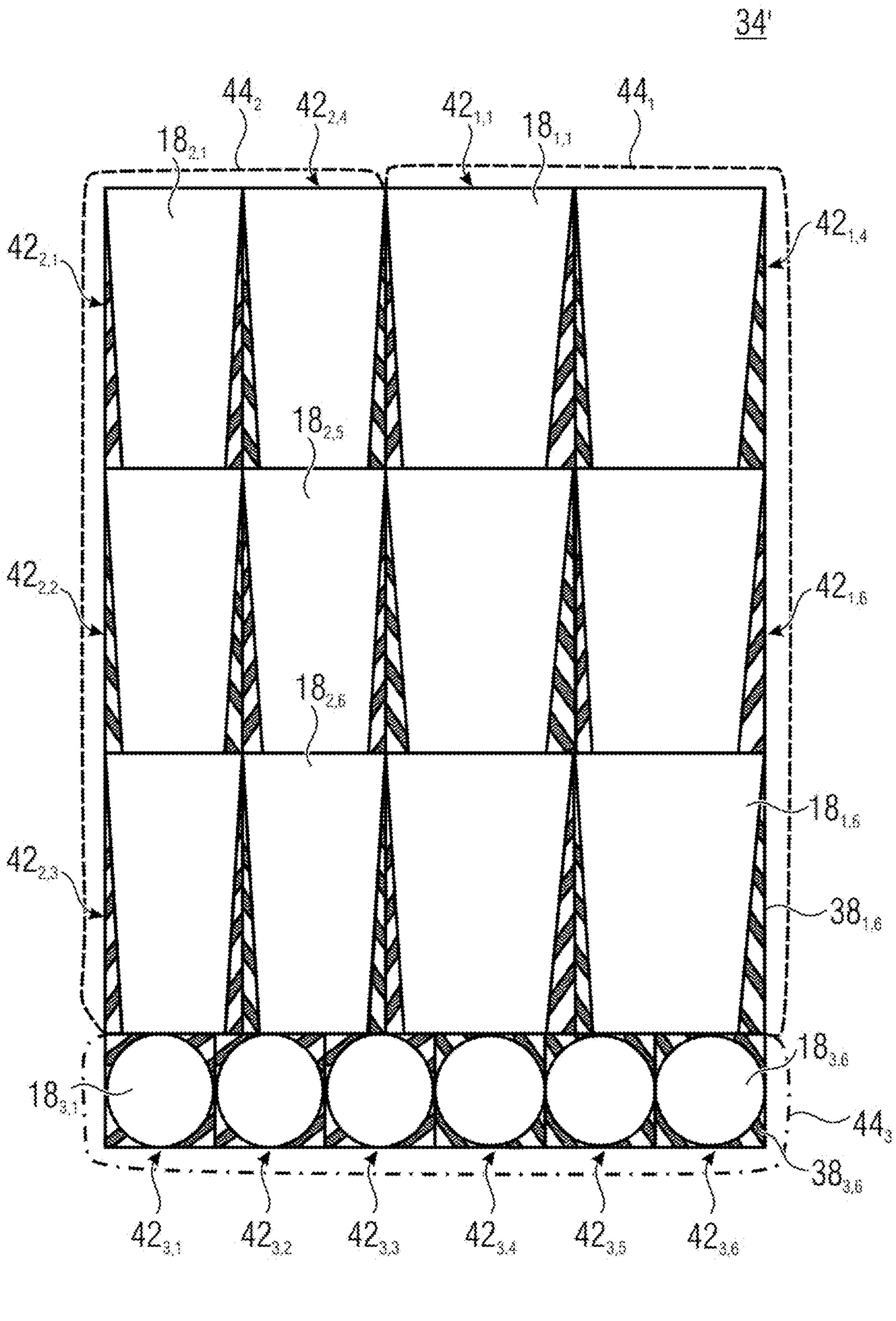
FIG. 2 is a schematic top view of a cluster modified compared to FIG. 1*d* according to an embodiment.

Apertures $36_1$, $36_2$ and $36_3$ of the condenser lenses $18_1$, $18_2$ and $18_3$, respectively, can have a shape adapted to a respective subarea $32_1$, $32_2$ and $32_3$, respectively. For this, the apertures or boundaries $36_1$, $36_2$ and/or $36_3$ can be, for example, geometrically similar to the outer boundaries of the respective subareas $32_1$, $32_2$ and $32_3$. The total amount of apertures $36_1$, $36_2$ and $36_3$ can be adapted to the overall pattern 28. According to an embodiment, a condenser lens of the cluster is configured such that the same comprises an aperture area which is influenced or determined by the apertures $36_1$, $36_2$ and/or $36_3$. As shown in FIG. 1*d*, the aperture area can be filled to form a channel area by means of an intermediate area at least partially surrounding the aperture area. The channel area can be, for example, rectangular, parallelogram-shaped, hexagonal or otherwise shaped and can be, for example, at least partially influenced by a configuration or aperture of an opposing projection lens. The plurality of channel areas in the cluster can be arranged to fill the area, as shown in FIG. 2, for example.

To improve the representation of the overall pattern, light-scattering areas $38_1$, $38_2$ and/or $38_3$ can be provided in the condenser lens array 16 and/or the cluster 34 thereof, which make it possible to fill in intermediate areas in the condenser lens array 16 when several condenser lenses are joined together, which are then later masked in the projected pattern. Such filling or geometry of the light-scattering areas $38_1$-$38_3$ can be configured in such a way that the corresponding outlines can be joined together without any problems. Filling between the apertures and the channel area of the lenslets $42_1$-$42_3$ can take place by means of areas $38_1$-$38_3$.

In other words, characters can be split and arranged to fill the area in segments and clusters. For projection, the character or pattern to be displayed can first be split into subgraphics, as explained in FIG. 1*c*. This splitting can be carried out in such a way that the channels of the segment are filled as well as possible. FIGS. 1*b* and 1*c* show splitting of an exclamation mark into two trapezoids $32_1$, $32_2$ and a circle $32_3$, which have a comparable size.

In order to ensure that the condenser apertures fill the area as well as possible, the subgraphics can be fitted into rectangular or square condenser lenslets, as shown in FIG. 1*d*. This means that apertures can be filled. As an alternative to a rectangular configuration, a different geometry can also be selected that enables good parqueting or an area-filling arrangement. These include triangles or hexagons, for example. The differences between the graphic part and the aperture of the lenslets can be formed as scattering areas $38_1$-$38_{(3)}$.

The advantage of filling is illustrated by the configuration of FIG. 2, which shows a modified cluster 34' in a schematic top view. The cluster 34' comprises, by way of example, three segments $44_1$, $44_2$ and $44_3$, wherein each segment comprises a number of adjacent, identically formed channels or lenses with the same, in particular congruent condenser lens boundaries, aperture, and is imaged onto the same area of a projection area, which can be set by a corresponding direction by means of the projection lens array. The optional scattering areas can be formed identically with respect to the respective boundaries, wherein this is not necessarily implemented. Alternatively or additionally, the configuration of the scattering areas can differ from channel to channel and/or from cluster to cluster. This means that several clusters can be part of an optical beam former.

Each segment $44_1$, $44_2$ and $44_3$ comprises, by way of example, a number of six identical lenslets $42_{1,1}$-$42_{1,6}$-$42_{3,1}$-$42_{3,6}$. It should be noted that the number of identical lenslets per segment $44_1$-$44_3$ is not necessarily the same, but can also be different. It also follows from this that the number of six identical lenslets per segment $44_1$-$44_4$ is chosen merely by way of example and, as shown for example in FIG. 1*d*, can be one or a higher value, which can be arbitrary and can, for example, be two, three, four, five or more.

The light-scattering areas 38 enable an area-filling arrangement of the respective lenslets in the cluster 34' and hence in the condenser lens array. According to an embodiment, an optical beam former is provided, wherein a filling factor of the condenser lenses 18 in the cluster 34, 34' and/or in the condenser lens array 18 is at least 70%, advantageously at least 75% and particularly advantageously at least 80%. Correspondingly, an area proportion of intermediate areas, which are possibly configured as light-scattering areas, can be at most 30%, at most 25% or at most 20%.

Embodiments provide that the intermediate areas of the condenser lens array and/or the cluster are equally distributed within a tolerance range or symmetrically distributed in one or several segments of the cluster 34' in the cluster 34, 34' and/or in a group of several clusters. The intermediate areas can interfere with the optical transmission and/or reduce a local brightness, in particular when configured as light-scattering areas. Such influences can be kept to a minimum for the optical observer due to the symmetrical distribution or the uniform distribution.

In other words, by the area-filling parqueting of, for example, six rectangular or square condenser apertures or lenslets 42 in each rectangular segment 44$_1$-44$_3$, an area-filling arrangement of the condenser apertures in three segments can be obtained, which together can in turn form a rectangular cluster 34'. The configuration of the cluster 34' as a rectangle advantageously enables parqueting of several clusters, wherein the rectangular configuration is not absolutely necessary. In this respect, FIG. 2 shows a parquetable cluster variant for arranging the parts of six exclamation marks in three segments.

This rectangular cluster, in turn, can be parqueted to fill the entire area in order to achieve the desired overall expansion of the honeycomb condenser. There are further possibilities for forming the segments and combining them as a cluster. For example, the circular area of the subarea 32 in FIG. 1*c* could be advantageously inscribed with a higher area filling into condenser lenslets with regular hexagonal boundaries. These could be arranged as a hexagonal array that can be densely parqueted. When configuring the cluster 34, 34', it is then possible to address the fact that a segment with non-rectangular boundaries is to be connected to the rectangular segments of the array of graphic parts 32$_1$ and 32$_3$ in FIG. 1*c*. Advantageously, the segments 44$_1$ and 44$_2$ can be configured to be larger, i.e. with a higher number of subgraphics, as a result of which proportionately smaller scattering connection areas are needed between the segments.

Figure 3:
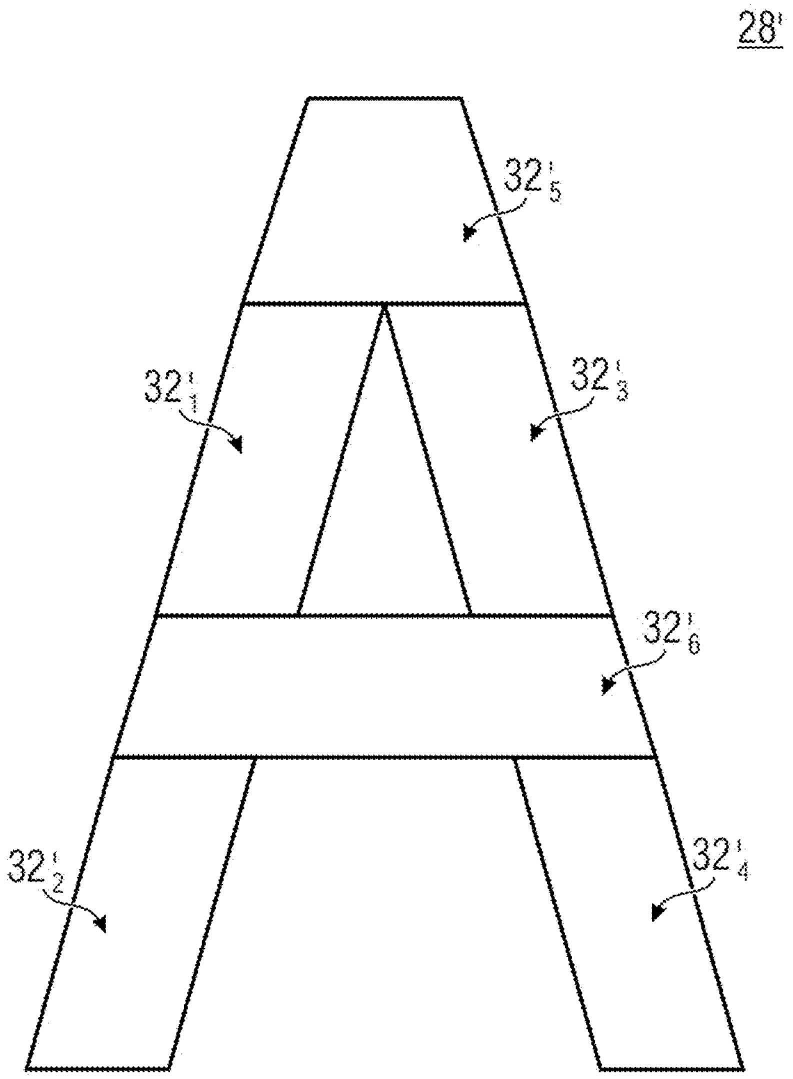
FIG. 3 is a schematic top view of a further pattern according to an embodiment, which is exemplarily represented by the letter A.

FIG. 3 shows a schematic top view of a pattern 28', which is exemplarily represented by the letter A, so that FIG. 3 exemplarily explains a further segment splitting for the letter "A". While the splitting of the exclamation mark of FIG. 1*b* resulted in trapezoidal or circular parts that do not completely fill the area, this can be carried out without any problems for the exemplary letter A, so that the segments 32'$_1$-32'$_4$ can be configured as parallelograms, for example, which can be arranged in a particularly advantageous way to fill the area, in particular in a parqueted arrangement. A parqueted arrangement can be understood to mean arranging two adjacent segments and, in particular, a higher number of segments in a volume without intermediate areas or with at most negligible intermediate areas. Shape and size of the subareas 32'$_1$ and 32'$_2$ on the one hand and 32'$_3$ and 32'$_4$ on the other hand can each be identical. Symmetries in the pattern to be split can be utilized here. In addition, there are two trapezoids 32'$_5$ and 32'$_6$, that cannot be or are difficult to be parqueted.

In other words, FIG. 3 shows the splitting of a letter "A" into parallelograms and trapezoids. Here, too, the letter "A" is merely used as an example of the pattern to be split and projected.

Figure 4A:
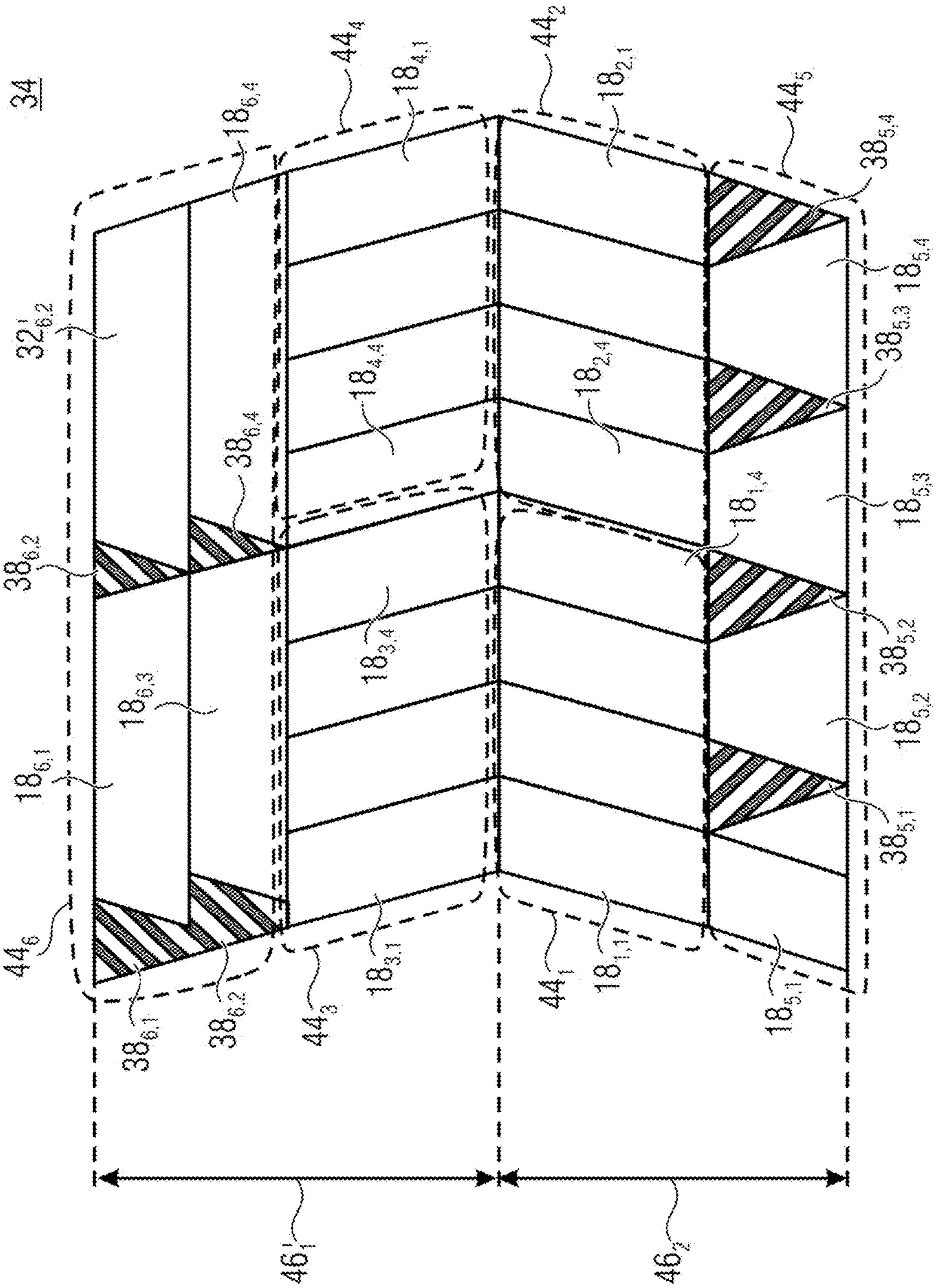
FIG. 4*a*-*b* are two different cluster variants for the arrangement of the six segments of the pattern in FIG. 3 according to embodiments.
Figure 4B:
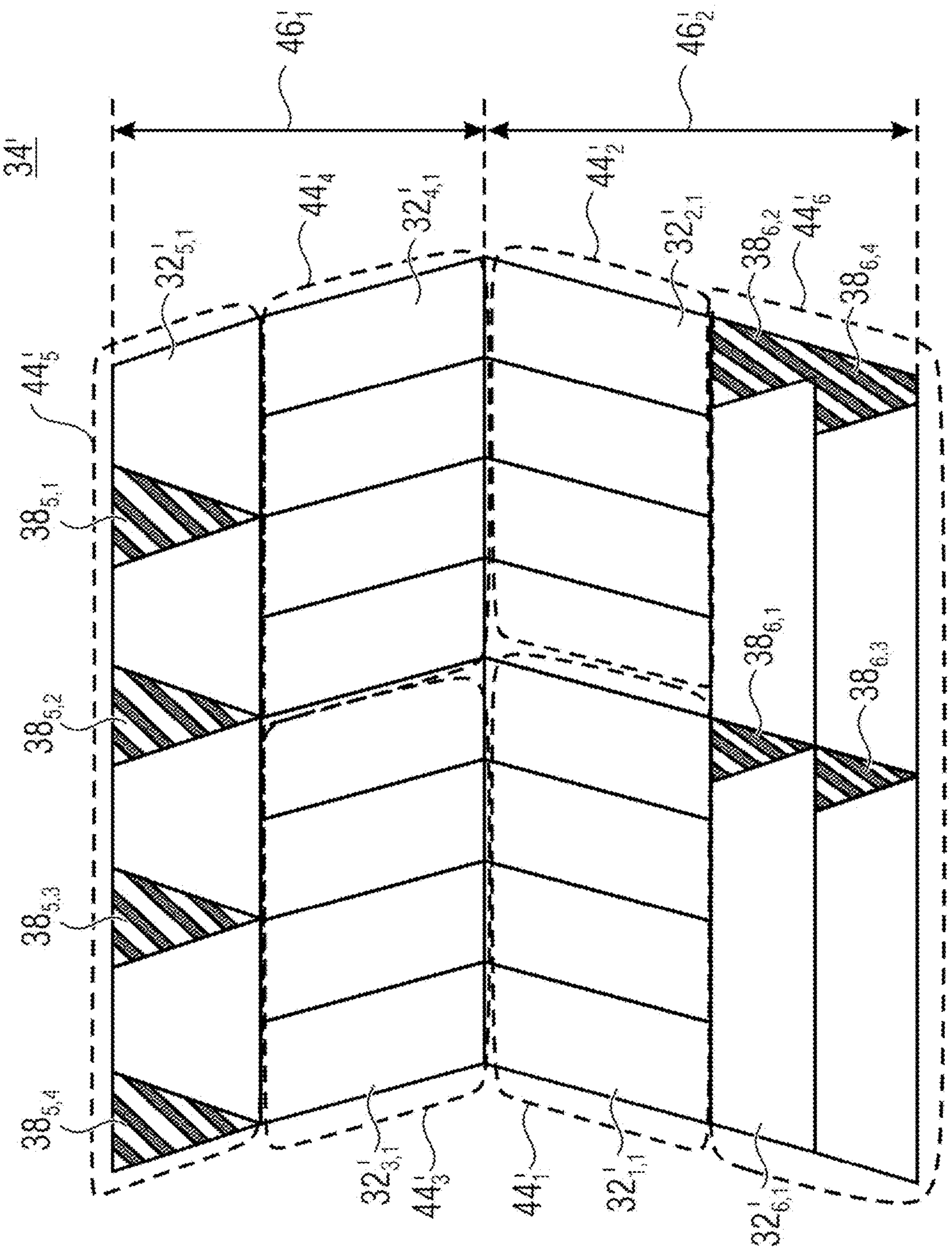

FIGS. 4*a* and 4*b* illustrate two different cluster variants for the arrangement of the six segments 32'$_1$-32'$_6$ of the pattern 28' of FIG. 3. A four-fold arrangement of condenser lenslets or condenser lenses 18$_{i,j}$ is illustrated by way of example, wherein in connection with FIGS. 4*a* and 4*b* the parameter i corresponds to the numbering of the subareas of FIG. 3 and the parameter j is a consecutive index within identical subareas or identically shaped lenses, which are combined to form segments 44$_1$-44$_6$. The clusters 44$_1$-44$_4$, which are already formed from parquetable apertures or joined together, can also be easily joined together, as shown for example in FIG. 4*a*, but also in FIG. 4*b*. If the condenser lenses 18 of different segments 44$_1$-44$_4$ differ, light-scattering areas 38 can be provided in the intermediate areas.

Intermediate areas 38$_{5,j}$ and 38$_{6,j}$ can be provided for the condenser lenses of the segments 44$_5$ and 44$_6$, which are less easy to parquet, in order to fill up a parquetable base area in each case. This can be particularly advantageous if the respective segments include condenser lenses 18 that are arranged in the same direction or in the same orientation and merely shifted relative to one another.

According to an embodiment, all condenser lenses can be arranged in an orientation that corresponds to the pattern to be projected.

As shown in FIG. 4*a*, in accordance with embodiments described herein, a cluster can comprise one or several segments, each comprising a plurality of condenser lenses whose respective aperture is adapted to the same subarea of the overall pattern. Different segments can have an equal or differing number of channels, which enables homogenization and/or individual adaptation of subareas with respect to brightness.

The cluster can comprise a plurality of condenser lenses, and each subarea of the overall pattern can be projected multiple times through the cluster, which is possible when using segments described herein, but can also be achieved otherwise, such as with a distributed arrangement of the condenser lenses directed to the same subarea. In both cases, the condenser lenses of the cluster can be arranged in a parqueted manner in the condenser lens array, wherein parqueting takes place at least in one subarea, as is shown, for example, for the segments 44$_1$-44$_4$, but also for the segments 44$_5$ and 44$_6$ arranged without gaps thereon, which also contributes to the parqueting.

The two or more segments of a cluster can be arranged adjacent to each other, as illustrated in FIG. 4*a*. Each of the segments can comprise a plurality of condenser lenses which are configured to project an identical subarea of the overall pattern. In the cluster 34, adjacent segments can be configured for projecting different subareas of the overall pattern, such as the different areas of FIG. 3. Light-scattering areas 38 between condenser lenses of the condenser lens array can be arranged for a uniform scattered light distribution in the projected pattern. This can be done, for example, in such a way that the light-scattering areas are appropriately distributed in relation to a respective segment and/or in relation to the cluster or to the overall pattern in order to consider the darkening caused by the light-scattering areas as a perceptible effect and to utilize it as a degree of design freedom. According to an embodiment, a different number of condenser lenses can be arranged to adjust a brightness of the subareas in order to project different subareas of the overall pattern. Such a difference can be achieved by different numbers in the cluster and/or in segments and/or by different configurations of clusters. A cluster or a combination of clusters can control the brightness of the subgraphics.

A difference between the cluster 34' of FIG. 4*b* and the cluster 34 of FIG. 4*a* can be that segments are arranged at different positions and/or possibly light scattering areas 38$_{5,1}$-38$_{5,4}$ and/or 38$_{6,1}$-38$_{6,3}$ are arranged at a different position in the cluster, which can result in different optical influences in the projected pattern caused by the light scattering areas 38. This provides a degree of freedom in the configuration and/or creation of the condenser lens array or optical beam former in that a position of the light scattering areas can be variable. For example, dimensions 46$_1$ compared to 46'$_1$ and/or 46$_2$ compared to 46'$_2$ can also be configured differently to one another, which enables further degrees of freedom with regard to the configuration of the clusters for increasing the packing density, in particular when using a higher number of clusters in the condenser lens array.

While the parallelogram portions $32'_1$-$32'_4$ or the corresponding apertures in the center of the clusters 34 and 34' can be densely packed, it can be helpful to partially mask the channels for the trapezoids $18_{5,1}$-$18_{5,4}$ and $18_{6,1}$-$18_{6,4}$ with diffusers or other light-scattering areas. The mixed arrangement of the two cluster variants in the character projector can enable a more even distribution of the interfering light components to the right and left of the trapezoidal parts of the projection of the letter "A".

In the two splitting examples described with reference to FIGS. 4*a* and 4*b*, examples are shown in which there is in each case an arrangement of identical graphic parts in a segment $44_1$-$44_6$. In special cases, an interleaved arrangement of different parts of a split in a mixed segment can be useful. One example is a space-filling arrangement of equilateral triangular apertures in a mixed segment, in which a triangle standing on one side and a triangle standing on an apex alternate with each other. If the parts of the graphic to be displayed consist of or include equilateral triangles that are rotated by 180° in relation to each other, this is a simple option for area-filling parqueting. Other options for parqueting are also possible and can be combined with each other if needed. In that way, hexagons and triangles can easily be joined together.

Both the cluster 34 and the cluster 34' are examples of embodiments in which the condenser lens array comprises a plurality of clusters that are arranged in a parqueted manner. This is particularly advantageous due to a configuration of clusters that enable a parqueted arrangement without having to provide significant intermediate areas.

Figure 5A:
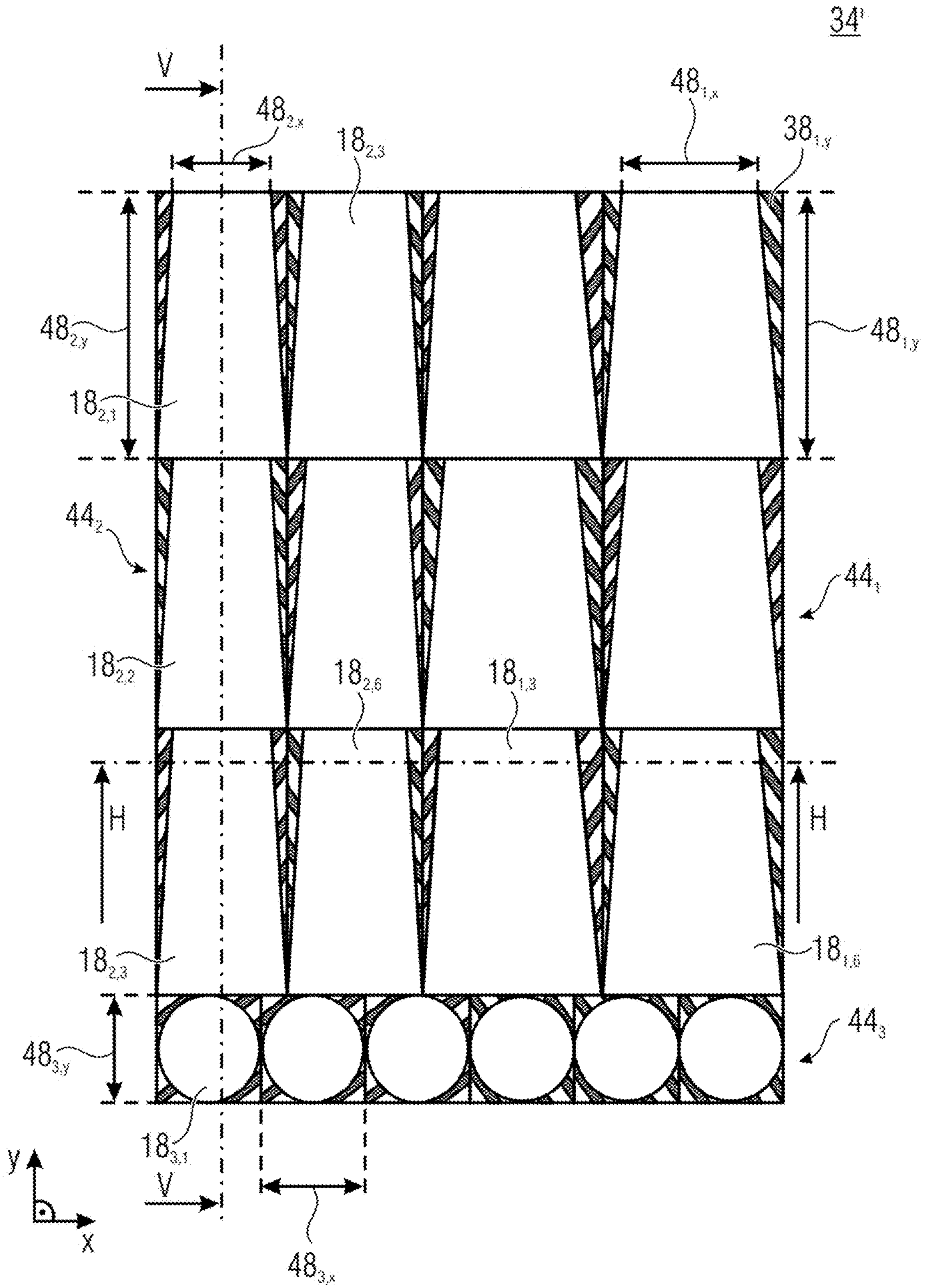
FIG. 5*a* is a schematic top view of the cluster of FIG. 2 with an additional representation of intersecting lines H-H and V-V according to an embodiment.
Figure 5B:
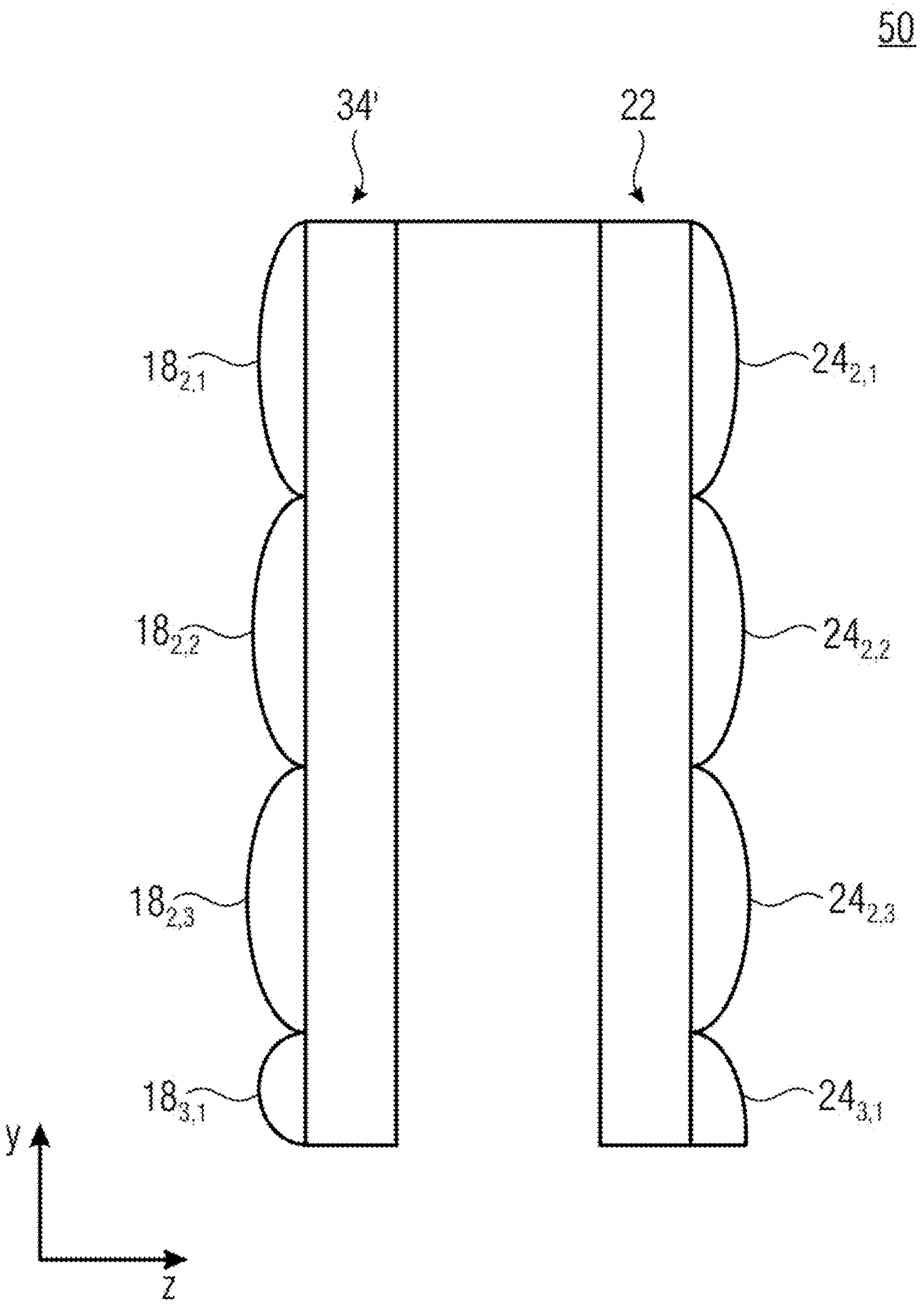
FIG. 5*b*-*c* are schematic side sectional views of the beam former from FIG. 5*a* in the intersecting lines.
Figure 5C:
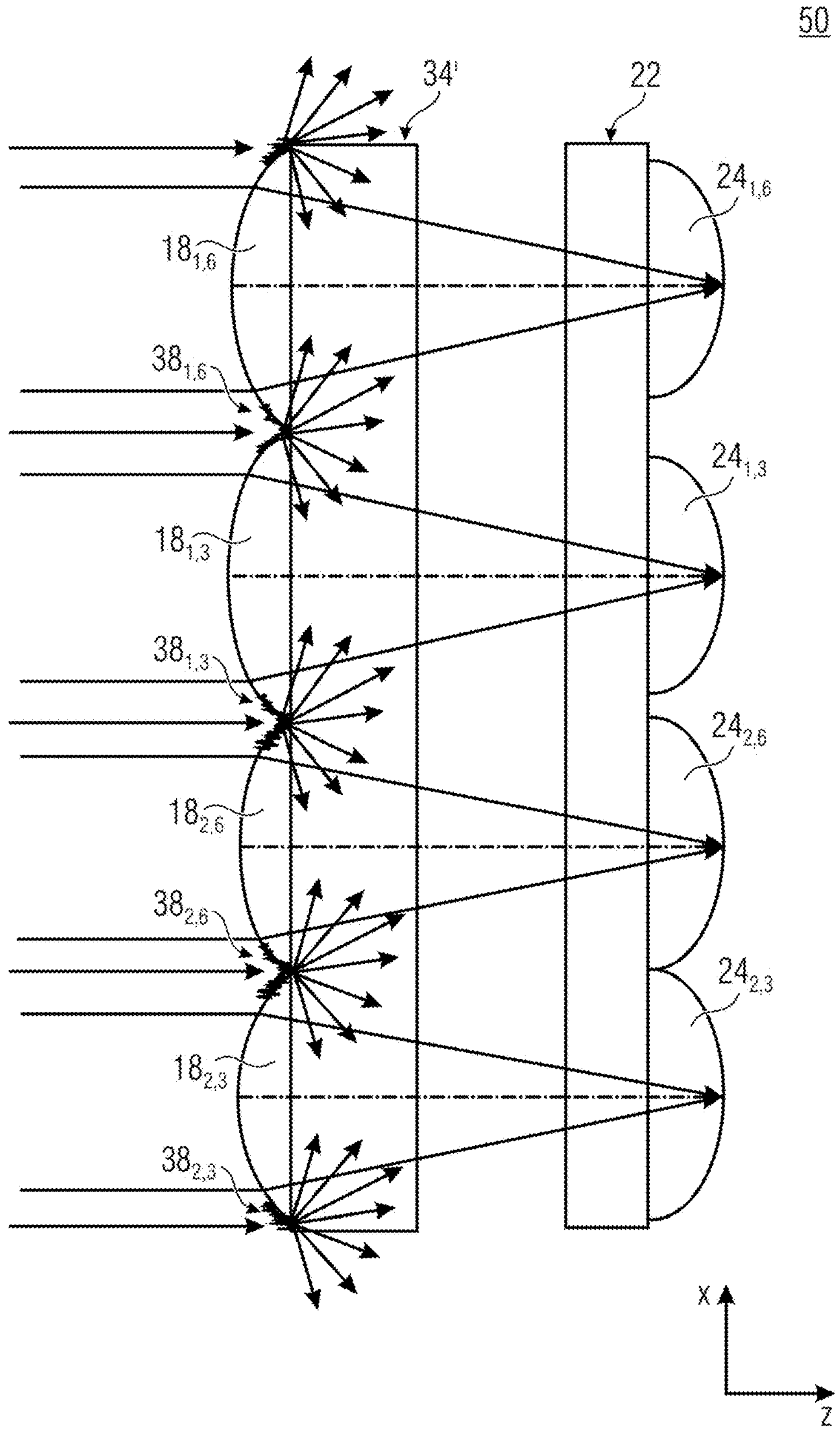

FIG. 5*a* shows a schematic top view of the cluster 34' of FIG. 2 with the segments $44_1$, $44_2$ and $44_3$ and an additional representation of intersecting lines H-H and V-V, which are arranged along an exemplary two-dimensional Cartesian coordinate system along the direction x and the direction y, which is perpendicular to it, for the optics configured for subsequent laterally correct and upright projection. FIGS. 5*b* and 5*c* use the sectional lines to describe schematic side sectional views of a beam former in accordance with embodiments. In addition, FIG. 5*a* also shows comparisons of dimensions $48_{i,x}$ and $48_{i,y}$, which indicate a dimension along the direction x or y of an aperture of the identically formed condenser lenses of the segments $44_i$. An aspect ratio $48_{i,x}$:$48_{i,j}$, which can describe an aspect ratio between a largest expansion and a smallest expansion of the aperture of each condenser lens, can be arranged according to an embodiment to have a value of at most four, at most three, at most two, advantageously less, and particularly advantageously of about one, as obtained, for example, for the circular aperture of the segment $44_3$. It should be noted that the reference directions for the largest and smallest directions of expansion can vary arbitrarily in space and are arranged rather randomly along the x and y directions.

Equally advantageous, wherein an independent design or layout parameter is implemented, is not only the aspect ratio of the respective condenser lens but also the difference or uniformity of condenser lenses of different arrays or lenses associated with different subareas. According to an embodiment, condenser lenses of the cluster differ from each other in relation to a largest expansion of the aperture, for example the expansion $48_{1,y}$ and $48_{2,y}$ in relation to $48_{3,y}$ or $48_{3,x}$ or alternatively $48_{2,x}$ in relation to a largest expansion of the aperture by a factor of at most five in relation to the cluster 34'. This avoids excessive deviations from each other and thus differences in channel crosstalk due to different degrees of diffraction and aberrations of the respective condenser lenslets in the overall pattern. According to other embodiments, these differences can be explicitly desired, wherein this entails consideration of additional effects of the lenses, for example consideration of different lens diffractions or the like.

In other words, for an exemplary system configuration, the case of projection to infinity can be discussed first. Viewed from the direction of the light source, for example, the subgraphics first has to be mirrored and rotated by 180°. The explanations described here concentrate on the representation of the exclamation mark. A channel-by-channel mirroring and rotation of the cluster is shown in FIG. 5*a*, viewed from the direction of the light source. For a correct projection, the projection lenses of a segment can image the respective subgraphics at a certain angle. For the example in FIG. 5*a*, this means that the segments $18_1$ and $18_3$ are projected upwards or downwards in relation to the image of segment $44_2$. This can be performed by forming the projector lenslets as correspondingly decentered lens segments.

FIG. 5*b* shows a schematic side sectional view of an optical beam former 50 according to an embodiment, which comprises the cluster 34' of FIG. 5*a*. The illustration is shown along the V-V intersecting line of FIG. 5*a*.

The oppositely disposed projection lens array 22 includes projection lenses $24_{2,1}$-$24_{2,3}$ and $24_{3,1}$, which can form a respective optical channel with a respective condenser lens $18_{2,1}$, $18_{2,2}$, $18_{2,3}$ and $18_{3,1}$, respectively.

Even if a different implementation is illustrated for the projection lens $24_{3,1}$, according to an embodiment, projection lenses of the projection lens array 22 can have a mutually identical aperture, which can, for example, be particularly large, particularly uniform and in particular formed without overlap.

The plurality of projection lenses 24 can each comprise an aperture whose geometry is independent of a geometry of the overall pattern, i.e. is configured differently from the apertures of the condenser lenses 18. Alternatively or additionally, a geometry of an aperture of a projection lens 24 can be different from an aperture of an opposing condenser lens 18.

Independently thereof, a projection lens 24 can be associated with each condenser lens 18. The associated projection lens can comprise an individual decentration with respect to the associated condenser lens in order to image a superimposition of the subimages of the overall pattern in the hyperfocal region, wherein this is an optional configuration.

The projection lenses can be decentered individually or as a group for various reasons. On the one hand, decentration can be used to achieve superimposition, e.g. focusing at a given distance, and on the other hand to achieve direction, i.e., separation of different image segments. Both implementation reasons can be implemented independently of each other, for example without taking the other reason into account, but can also be implemented together.

In other words, FIG. 5*b* shows the side view of the vertical section V-V through the honeycomb condenser marked in FIG. 5*a*. While the projector lenslets $24_{2,1}$, $24_{2,2}$, and $24_{2,3}$ can image the channels 18 for the central part of the graphic without deflection to infinity, a decentered lens segment $24_{3,1}$ can provide a downwardly shifted image of the point of the exclamation mark, for example in order to obtain a distance of the trunk to the point of the exclamation mark in the overall pattern which is not present in the cluster 34'.

Another possibility is a suitable decentered arrangement of the condenser lenslets 18 relative to the projector lenslets 24. In this case, condenser lenslets can advantageously be configured as decentered lens segments. Depending on the respective graphic to be illustrated and the selected splitting, a mixed form of both approaches can also be possible, as described for example in [7], which enables projector lenslets 24 of the same or at least similar size and thus an etendue-preserving mode of operation of the beam former.

It should be noted that the decentration between the condenser lens aperture (the object to be imaged) and the projection lens vertex can be decisive for both direction and focusing. Three basic realizations can be considered for direction and focusing:

1. An arrangement of the projection lenses that is merely decentered in relation to the condenser lenses;
2. The variant from 1. and additionally the configuration of the condenser lenslet as a decentered lens segment within the condenser lens aperture, which images the source into the decentered projection lens.
3. A projection lens aperture centered with respect to the condenser lens aperture and a projection lens configured as a decentered lens segment within the centered PL aperture.

Variant 3 offers possibly the greatest advantages in terms of etendue preservation and good stray light suppression. Although variant 2 maintains the etendue, it complicates condenser lens manufacture and potentially increases stray light/channel crosstalk, although these limitations can be acceptable compared to the advantages of the invention. Variant 1, on the other hand, reduces the acceptance angle of the beam former with unchanged stray light suppression.

Projection to a finite distance is possible, for example, by a downstream focusing optic in a projector that comprises an optical beam former described herein and a light source for providing the incident light. The projection can be both hyperfocal and use decentration, or alternatively to the projection distance using focused projection lenses and using decentration. In other words, a projector can comprise focusing optics and/or individual projection lens decentering for focusing the overall pattern or the correct superposition of channel images in an imaging plane. By means of the focusing image, it can be possible to image in its focal plane. Alternatively, with sufficiently small projector lenslets 24 operating in the exemplary but not necessary hyperfocal region, focusing is possible by individually decentering the projector lenslets relative to the respective condenser lenslets according to the approach of the array projector [2].

An embodiment can be configured in such a way that while the non-scattering areas of the condenser lenslets 18 image the light source only onto the respectively associated projector lenslet 24, the scattering areas distribute the incident light onto many, advantageously distant projector lenslets 24 and thus reduce the brightness of the projection by the associated projection lenslet 24 to such an extent that a sufficient contrast between the projected part, see FIGS. 1*d*, $\mathbf{18}_1$, $\mathbf{18}_2$, $\mathbf{18}_3$, of the exclamation mark and the difference quantity to be masked, see FIGS. 1*d*, $\mathbf{38}_1$, $\mathbf{38}_2$ and $\mathbf{38}_3$, to the condenser aperture, see FIGS. 1*d*, $\mathbf{36}_1$, $\mathbf{36}_2$ and $\mathbf{36}_3$, is achieved.

FIG. 5*c* shows a top view of the horizontal section H-H of FIG. 5*a*. The areas $\mathbf{18}_{1,6}$, $\mathbf{18}_{1,3}$, $\mathbf{18}_{2,6}$ and $\mathbf{18}_{2,3}$ of the condenser lenslets to be imaged can image the light source into the associated projection lenslets in the illumination optical path, which can also be referred to as Köhler illumination, and thus enable high-speed imaging of these areas of the condenser lenslet through the associated projection lenslet. The light-scattering areas 38 distribute the irradiated light to many, advantageously more distant, adjacent channels. Together with the greater aberrations in this case when imaged by distant projector lenslets, this can reduce the brightness of the projection of these areas, in particular to such an extent that the respective part of the character is displayed with sufficient contrast.

As already shown in the schematic representations of FIGS. 5*b* and 5*c*, a filling factor of the projection lenses in the projection lens array 22 can be particularly high and, for example, be at least 90%, at least 92% or at least 95%. Different optical properties can be used to adjust a direction. According to an embodiment, a condenser lens aperture can be arranged offset with respect to a vertex of a projection lens associated with the condenser lens in order to adjust the direction, i.e. the directional setting of the projection, of a projection effected by the projection lens. For example, an aperture of the projection lens 24 can be arranged opposite to the aperture of the condenser lens and the projection lens 24 can include a decentered lens element, as illustrated, for example, for the lens element $\mathbf{24}_{3,1}$, to at least partially effect the direction. Alternatively or additionally, the condenser lens 18 can include a decentered lens segment. This can influence the illumination of the projection lens, wherein the direction can remain unaffected.

In other words, FIG. 5*c* shows a horizontal section through the cluster of FIG. 5*a*. The scattering areas 38 are only indicated for the respective lower channel, lower position of the value x, for better illustration.

The light-scattering areas 38 shown hatched in FIG. 5*a* can be realized as simple surface scatterers with a microscopic, statistically rough surface. Alternatively, realization as a deterministic diffuser is possible, as described in [8], for example. In this case, it is advantageous if the scattering surface profiles are not repeated in the channels of a segment to avoid hotspots in the projection. A further realization is a configuration as a concave lenslet, which distributes the light of this area over the largest possible angular range and thus over many projector lenslets. This concave lenslet can be configured as a Fresnel lenslet, for example. Similar to or the same as with a deterministic diffuser, the concave lenslet can or should be configured slightly differently in each channel of a segment in order to avoid hotspots when imaging the scattering areas. This means, for example, a configuration as a channel-wise decentered lenslet and, in the case of the configuration as a Fresnel element, additionally the positioning of the trailing edges of the Fresnel zone at different positions within the channels of a segment.

Taking this up, embodiments provide for light-scattering areas 38 to be configured as diffuser, as a concave lenslet and/or as a statistical surface scatterer. Different light-scattering areas in a cluster can be configured in such a way that the optical properties of the light-scattering areas for scattering light differ from one another. Such properties can be, for example, scattering angles, positioning of artifacts or the like. According to an embodiment, light-scattering areas can be configured as segmented light-scattering areas. An example of such segmented light-scattering areas are the aforementioned Fresnel lens structures, in which Fresnel trailing edges of a respective Fresnel lens structure are advantageously arranged offset with respect to another Fresnel lens structure in order to adjust the different optical properties.

Figure 6:
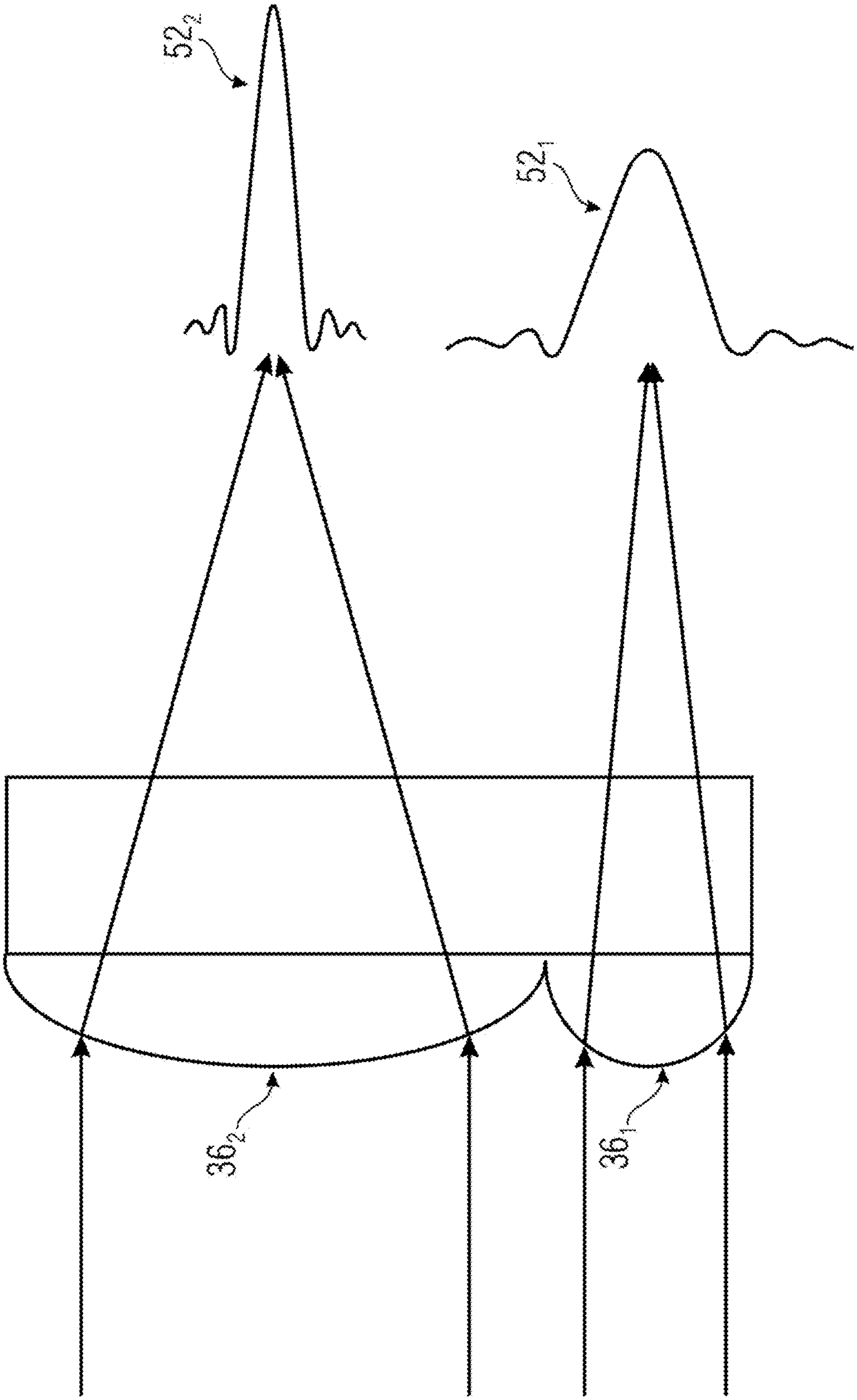
FIG. 6 is a comparison of the behavior of lenses with large and small numerical apertures to illustrate the embodiments described herein.

Further, other aspects can be considered when configuring the system and dividing the graphics into segments and taken into account when configuring the lenses. For example, it can be needed to split the graphics into as few and similarly sized segments as possible, as illustrated in FIG. 1*b* and/or FIG. 3. This makes it possible to avoid comparatively small numerical apertures (NA) in the illumination optical path. Reference is made to FIG. 6. An NA of the condenser lenslet $36_1$ that is too small can cause a comparatively large Airy diffraction disk $52_1$ in the projected light distribution, which can extend into the adjacent projector lenslets and thus cause channel crosstalk. Comparatively large condenser lenslets $36_2$ can produce a larger illumination NA and thus inversely proportional comparatively smaller Airy disks $52_2$, thereby reducing or avoiding channel crosstalk, which is beneficial to the overall projection. On the other hand, large condenser lenses have a large NA (or low f/#) and therefore tend to produce larger aberrations, which can blur the image of the light source in the projection lens and thus also lead to channel crosstalk. A favorable but not limiting trade-off between both limitations is an NA in the range of approx. 0.1 . . . 0.2.

The expansion of the channel input apertures can be configured such that they are as similar as possible in order to avoid large fluctuations in the arrow heights of the condenser lenslets from segment to segment. Such jumps in height can generate stray light that can reach into adjacent condenser lenslets and thus also cause channel crosstalk. Further, this enables the projector lenslets to be configured with identical or at least similar pitch, i.e. distance or repeat distance. This enables the projector to operate in an etendue-preserving manner [6, 7]. The area of the diffuser areas 38 within and between the segments as well as between adjacent clusters can be minimized to achieve a high usable transmission. The type of splitting of the characters to be displayed determines or at least influences this.

The approaches proposed herein are based on a modified, irregular honeycomb condenser architecture with microlens arrays having irregular boundaries similar to [6] with additional scattering structures. The approach described herein avoids the buried slide structures previously needed in the array projector from [2].

A collimated light source, e.g. a collimated LED, illuminates the irregular honeycomb condenser, the area of which is made up of several identical clusters that fill as much of the area as possible. Each cluster in turn consists of several segments, which are also arranged next to each other to fill as much of the area as possible. If it is not possible to fill the area of the clusters or their segments, the remaining gaps are configured as light-scattering areas, thus suppressing their projection.

The input apertures of the identical condenser lenslets of each segment each correspond to a part of the projected character. Their boundary geometry, such as rectangle, square, parallelogram or hexagon, can enable area-filling parqueting. If there is no complete correspondence between the part of the character and the area-filling boundary geometry, the remaining part of the condenser lenslet can be configured as a scattering area, thus suppressing its projection. In order to achieve the highest possible system transmission and a high-contrast projection, the areas of the scattering areas can be configured to be as small as possible in proportion to the above-mentioned gaps between segments and clusters.

The output apertures of the projector lenslet of each segment are advantageously adapted as well as possible to the far-field distribution of the light radiated into the honeycomb condenser. In the case of a collimated LED light source or other collimated light sources, this can correspond to a square aperture, for example. The projection lenslets can also be arranged to fill the entire surface in order to make good use of the advantages of the invention. This enables an almost etendue-preserving projection [6]. However, the area-filling configuration of the condenser lenslets on the input side and the minimization of the scattering areas can have a comparatively higher priority. A noteworthy function of the projection lenslets can be the imaging of the individual parts of the character, i.e. the condenser lenslets of a segment, at a certain angle in order to achieve the correct arrangement of the projection of the individual parts in the projection (direction). For this purpose, the projector lenslets are configured as decentered lens segments, for example.

Figure 7:
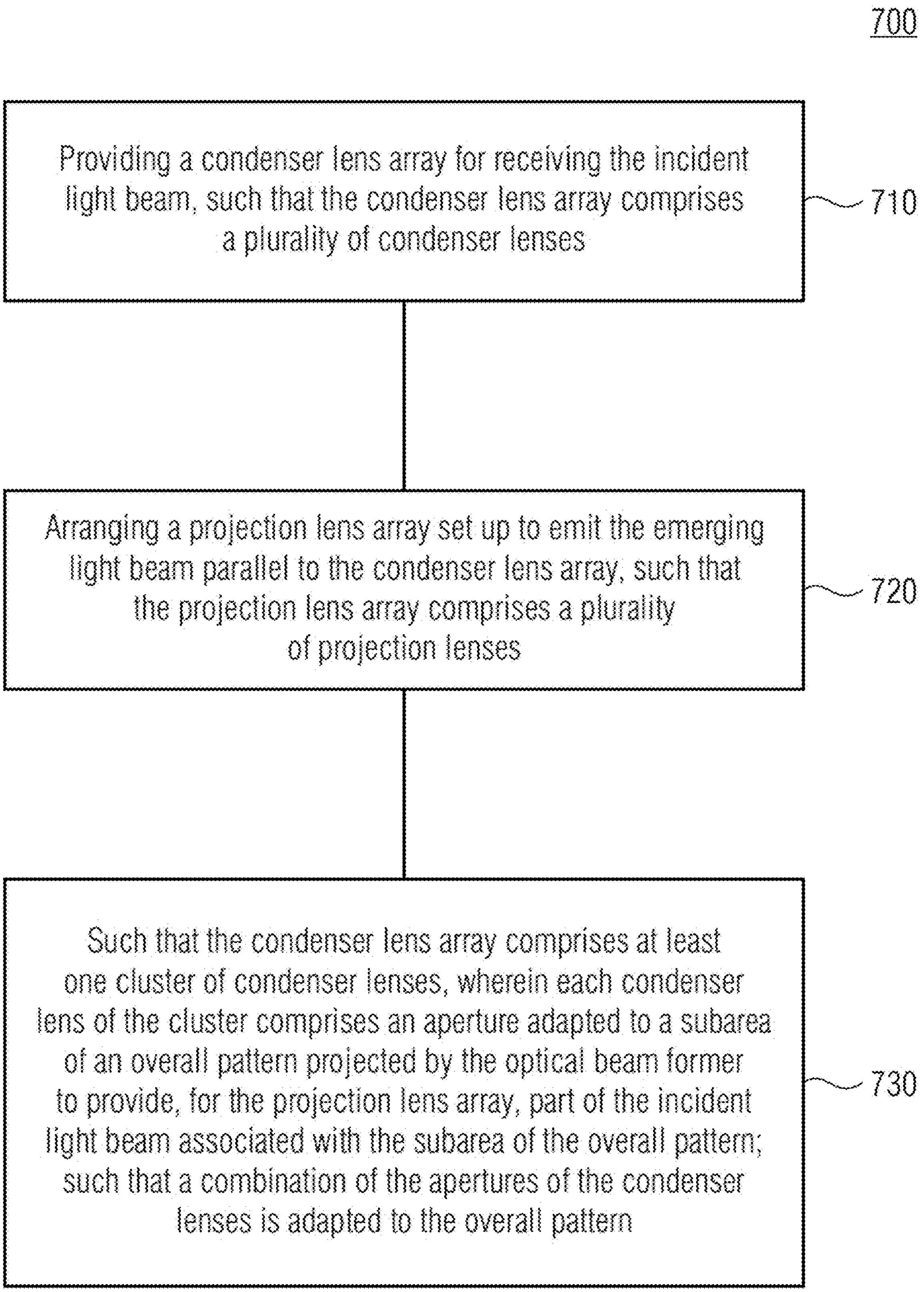
FIG. 7 is a schematic flow diagram of a method according to an embodiment, which can be used, for example, for providing an optical beam former in correspondence with embodiments described herein.

FIG. 7 shows a schematic flow diagram of a method 700 according to an embodiment that can be used, for example, to provide an optical beam former in accordance with embodiments described herein.

A step 710 comprises providing a condenser lens array for receiving the incident light beam such that the condenser lens array comprises a plurality of condenser lenses. A step 720 comprises arranging a projector lens array arranged to emit the emerging light beam parallel to the condenser lens array, such that the projection lens array comprises a plurality of projection lenses. One or more boundary conditions 730 are thereby implemented such that the condenser lens array comprises at least one cluster of condenser lenses, wherein each condenser lens of the cluster comprises an aperture adapted to a subarea of an overall pattern projected by the optical beam former to provide, for the projection lens array, part of the incident light beam associated with the part of the overall pattern. This is done in such a way that a combination of the apertures of the condenser lenses is adapted to the overall pattern.

Figure 8:
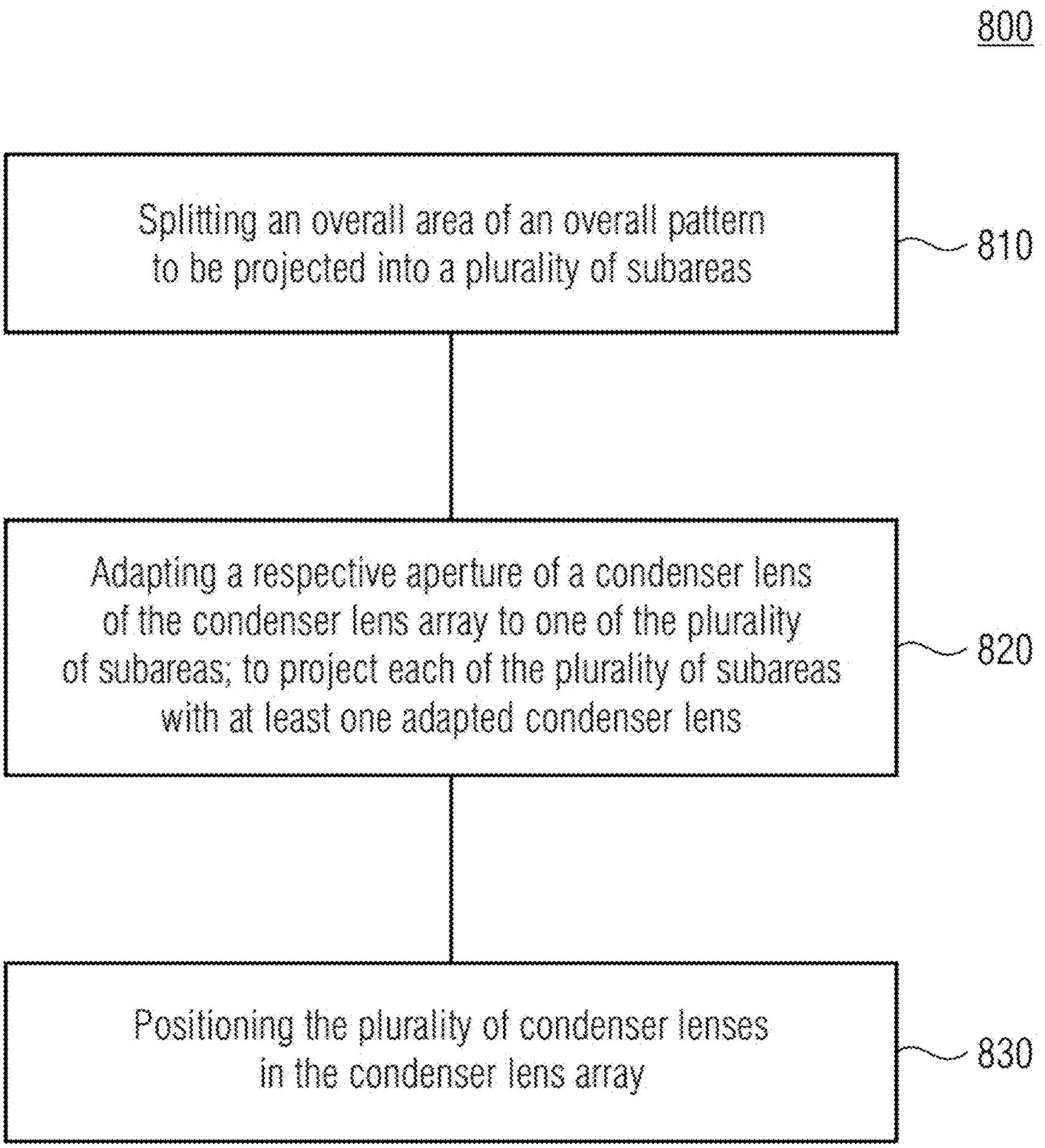
FIG. 8 is a schematic flow diagram of a method according to an embodiment, which can be used, for example, for configuring a condenser lens array described herein.

FIG. 8 shows a schematic flow diagram of a method 800 according to an embodiment that can be used, for example, for configuring a condenser lens array described herein. A step 810 comprises splitting an overall area of an overall pattern to be projected into a plurality of subareas.

A step 820 includes adapting a respective aperture of a condenser lens of the condenser lens array to one of the plurality of subareas to project each of the plurality of subareas with at least one adapted condenser lens.

A step 830 includes positioning the plurality of condenser lenses in the condenser lens array.

The method 800 can be performed such that the condenser lenses are configured such that an aspect ratio between a largest expansion and a smallest expansion of the aperture of each condenser lens has a value of at most four.

The method 800 can alternatively or additionally be carried out in such a way that the condenser lenses are configured in such a way that condenser lenses of one cluster differ from one another by a factor of at most five in relation to a maximum expansion of the aperture.

The method 800 can alternatively or additionally be carried out such that the positioning 830 comprises parqueting the condenser lenses in at least one cluster with at least one segment, and a light-scattering area is provided in intermediate areas of adjacent apertures in the parqueting.

Adapting 820 can optionally be carried out in such a way that a cluster of condenser lenses of the condenser lens array comprises a plurality of adjacent segments and light-scattering intermediate areas between apertures of the condenser lenses of a segment are arranged with low repetition in relation to at least one other segment in relation to the local arrangement, which means, for example, that uniform distribution is at least aimed for.

The method 800 includes the step of manufacturing the condenser lens array, wherein the manufacturing can be performed at a different position or location and can include, for example, transmitting the results of the method 800 to a manufacturing device.

Figure 9:
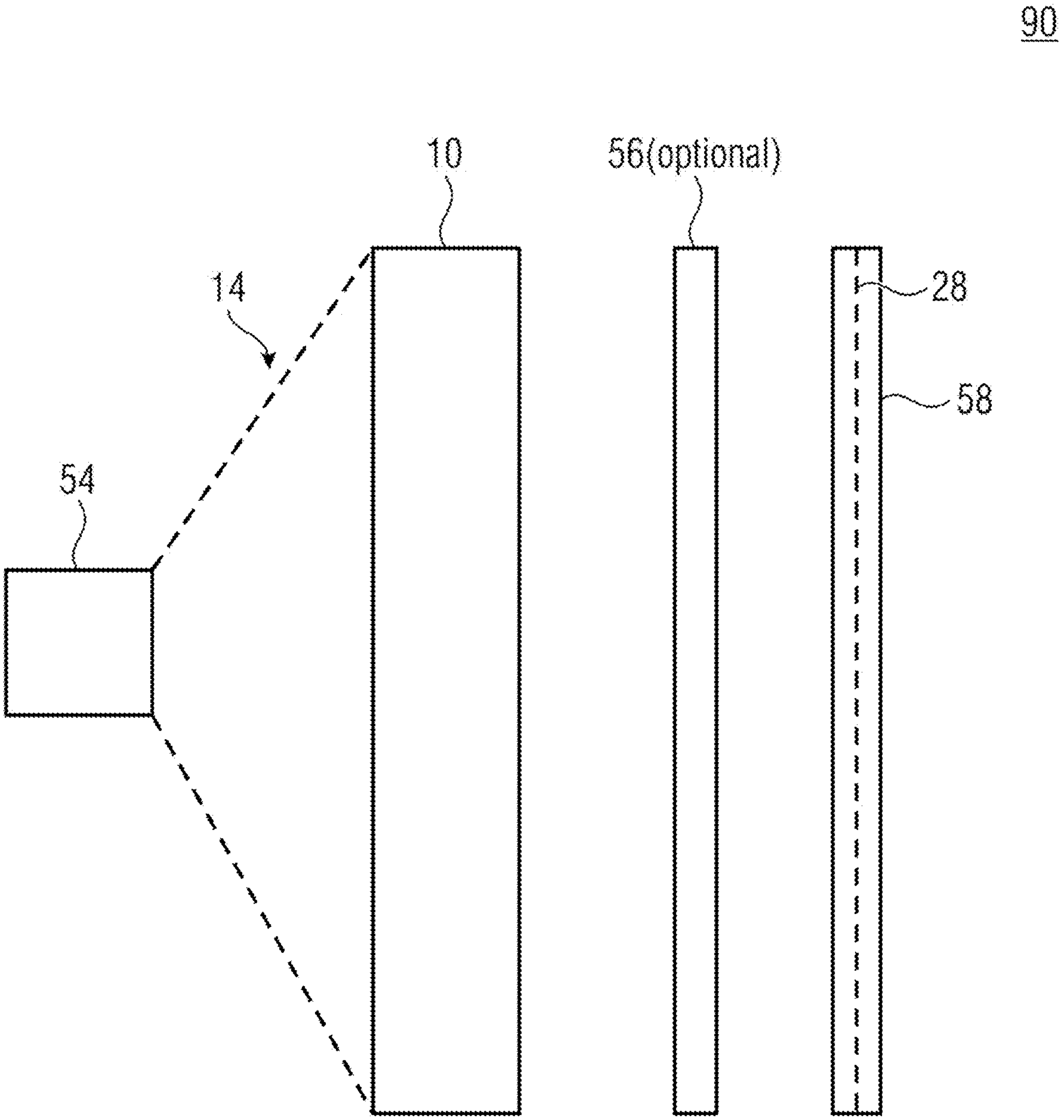
FIG. 9 is a schematic block diagram of a projector according to an embodiment.

FIG. 9 shows a schematic block diagram of a projector 90 according to an embodiment. The same includes a light source 54 for providing the incident light beam 14 and an optical beam former according to an embodiment, such as the beam former 10, although other beam formers described herein and in particular condenser lens arrays can be provided. The light source 54 can be, for example, a collimated light source, which can be achieved by using additional or already integral collimating optics. According to an embodiment, the plurality of projection lenses of the beam former 10 can comprise an aperture whose shape is adapted to a far-field distribution of the light source 54. Optionally, the projector 90 can comprise focusing optics 56 for focusing the overall pattern into an imaging plane 58.

In other words, embodiments described herein can be configured as a maskless character projector that can eliminate the need for absorbing slide or aperture structures. This enables high system transmission and simplifies manufacturing or enables new manufacturing technologies, such as plastic injection molding or hot stamping. By using a modified honeycomb condenser architecture, a dependency between the angle of incidence and the radiated far-field distribution can be reduced or eliminated as long as the angle of incidence is less than or equal to the acceptance angle of the honeycomb condenser. A simple adaptability to the projection onto inclined and/or curved projection areas can be achieved similar to the array projector architecture according to [3].

The embodiments described herein can be used in particular in the field of automotive interior and exterior lighting, such as character projection onto the road for Car2X communication and interior lighting for clearly defined illuminated areas. Alternatively or additionally, symbols can be projected for safety and advertising applications, wherein any other applications are possible.

Implementation aspects of embodiments described herein also refer to:

1. Maskless character projector consisting of at least or comprising a cluster of honeycomb condensers consisting of at least two different segments each formed of a condenser array with condenser lenslets having identical boundaries that fill the entire area, some of which comprise scattering areas, and a projector array with decentered lenslets, wherein each segment projects part of the character to be projected to a specific location on the projection screen or at a specific angle to infinity, so that the character is re-combined on the screen or at infinity from the projected parts.

2. Formation of the scattering areas on the condenser arrays by statistically scattering, matted surfaces.

3. Formation of the scattering areas on the condenser arrays by deterministically scattering, structured surfaces, wherein the scattering surface profiles differ within the condensers of a segment.

4. Formation of the scattering areas by concave curved surfaces, which differ within a segment within the condensers of a segment.

5. Formation of the concave curved surfaces from point 4 as Fresnel structures with different positions of the Fresnel trailing edges within the condensers of a segment.

6. Suppression of imaging of areas not covered by condenser lenslets between two adjacent segments or two adjacent clusters by scattering structures similar to points 2-5 in these areas.

7. Formation of the scattering areas according to points 2-6 as wide-angle scatterers.

8. Formation of the base area of the scattering areas from points 2-7 as free-form areas, so that height profile jumps at the transitions to adjacent condenser lenslets are avoided.

9. Projection of the character with homogenous brightness by identical frequency of the individual parts of the splitting in the cluster 10. Projection of different parts of the character in different brightness due to different frequencies of the character parts within the cluster.

11. Formation of the character projector as an irregular tandem microlens array.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium can be computer readable. Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code can, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals can be configured, for example, to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array, FPGA) can be used to perform some or all of the functionalities of the methods described herein. In some embodiments, a field programmable gate array can cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] Geißler, Enrico "Meeting the challenges of developing LED-based projection displays." Photonics in Multimedia. Vol. 6196. SPIE, 2006.

[2] Sieler, Marcel et al. "Ultraslim fixed pattern projectors with inherent homogenization of illumination", Appl. Opt. 51 (2012) 64-71.

[3] Fischer, Stephanie et al. "Array projector design for projection on arbitrarily curved surfaces." Optical Systems Design 2015: Optical Design and Engineering VI. Vol. 9626. SPIE, 2015.

[4] Dannberg, Peter et al. "Wafer-level hybrid integration of complex micro-optical modules." Micromachines 5.2 (2014): 325-340.

[5] Buckley, Edward "Computer-Generated Phase-Only Holograms for Real-Time Image Display", November 2011, DOI:10.5772/18709.

[6] Li, Chen et al. "Optical beam former", DE 102017217345 B4.

[7] Schreiber, Peter et al. "Light Shaping with Micro-optical Irregular Fly's Eye Condensers", IODC 2021, vol. 12078, SPIE 2021, 1207813.

[8] Eckstein, Hans-Christian et al. "Electromagnetic radiation-scattering element and method of manufacturing same", U.S. Pat. No. 10,254,449 B2.

The invention claimed is:

1. Optical beam former for generating an emerging light beam from an incident light beam, the optical beam former comprising:

a condenser lens array for receiving the incident light beam, wherein the condenser lens array comprises a plurality of condenser lenses; and a projection lens array arranged parallel to the condenser lens array for emitting the emerging light beam, wherein the projection lens array comprises a plurality of projection lenses wherein the condenser lens array comprises at least one cluster of condenser lenses, wherein each condenser lens of the cluster comprises an aperture adapted to a subarea of an overall pattern projected by the optical beam former to provide, for the projection lens array, part of the incident light beam associated with the subarea of the overall pattern; wherein a combination of the apertures of the condenser lenses is adapted to the overall pattern;

wherein the overall pattern is a graphic to be illustrated; wherein each subarea images a subgraphic of the overall pattern;

wherein the aperture of the condenser lens is a boundary of the condenser lens and is formed geometrically similar to outer boundaries of the respective subarea.

2. Optical beam former according to claim 1, which is formed as a maskless character projector; and/or is formed without a buried slide structure.

3. Optical beam former according to claim 1, wherein an intermediate area between apertures of adjacent condenser lenses of the cluster is configured as a light-scattering area.

4. Optical beam former according to claim 3, wherein several intermediate areas of the condenser lens array are equally distributed or symmetrically arranged within a tolerance range in at least one of a segment of the cluster, in the cluster or in a group of several clusters.

5. Optical beam former according to claim 3, wherein a filling factor of the condenser lenses in the cluster and/or in the condenser lens array is at least 70% and an area proportion of intermediate areas between adjacent apertures is at most 30%.

6. Optical beam former according to claim 3, wherein a condenser lens of the cluster comprises an aperture area and the aperture area is filled to a channel area by means of an intermediate area at least partially surrounding the aperture area; and a plurality of channel areas are combined in the cluster in an area-filling arrangement.

7. Optical beam former according to claim 1, wherein a condenser lens aperture is arranged offset with respect to a vertex of a projection lens associated with the condenser lens to adjust a direction of a projection effected through the projection lens.

8. Optical beam former according to claim 1, wherein the cluster comprises a segment with a plurality of condenser lenses whose respective aperture is adapted to the same subarea of the overall pattern; or wherein the cluster comprises a plurality of condenser lenses, and each subarea of the overall pattern is projected multiple times through the cluster; wherein the condenser lenses of the cluster are arranged parqueted in the condenser lens array.

9. Optical beam former according to claim 1, wherein the cluster comprises a plurality of segments arranged adjacent to each other, and each segment comprises a plurality of condenser lenses configured for projecting an identical subarea of the overall pattern; and adjacent segments are formed in the cluster for projecting different subareas of the overall pattern, wherein light-scattering areas are arranged between condenser lenses of the condenser lens array for a uniform scattered light distribution in the projected pattern.

10. Optical beam former according to claim 1, wherein the condenser lens array comprises a plurality of clusters arranged in a parqueted manner.

11. Optical beam former according to claim 1, wherein the plurality of projection lenses each comprise an aperture whose geometry is independent of a geometry of the overall pattern and/or is different from a geometry of an aperture of an opposing condenser lens.

12. Optical beam former according to claim 1, wherein each condenser lens of the condenser lens array is associated with a projection lens, and the associated projection lens comprises an individual decentering with respect to the associated condenser lens for superimposing the partial images to image the overall pattern in the hyperfocal region.

13. Projector comprising:

an optical beam former according to claim 1; and a light source for providing the incident light beam.

14. Projector according to claim 13, wherein the light source comprises a collimated light source.

15. Projector according to claim 14, comprising focusing optics or individual projection lens decentering for focusing the overall pattern or correct superposition of channel images into an imaging plane.

16. Projector according to claim 13, wherein the plurality of projection lenses comprise an aperture whose shape is adapted to a far-field distribution of the light source.

* * * * *